United States Patent
Chang et al.

(10) Patent No.: US 7,636,363 B2
(45) Date of Patent: Dec. 22, 2009

(54) ADAPTIVE QOS SYSTEM AND METHOD

(75) Inventors: Shu-Ping Chang, Shrub Oak, NY (US);
Fei Li, New York, NY (US); James Sargent Lipscomb, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 10/813,865

(22) Filed: Mar. 31, 2004

(65) Prior Publication Data

US 2005/0025064 A1    Feb. 3, 2005

Related U.S. Application Data

(60) Provisional application No. 60/490,627, filed on Jul. 28, 2003.

(51) Int. Cl.
*H04L 12/28* (2006.01)
(52) U.S. Cl. .................................. 370/395.42
(58) Field of Classification Search .................. None
See application file for complete search history.

(56) References Cited

U.S. PATENT DOCUMENTS 5,461,699 A * 10/1995 Arbabi et al. ................. 706/21
5,754,841 A * 5/1998 Carino, Jr. ..................... 707/3
2003/0081624 A1 * 5/2003 Aggarwal et al. ............ 370/412
2003/0233464 A1 * 12/2003 Walpole et al. .............. 709/231

OTHER PUBLICATIONS

Kawarasaki et al., "Metadata associated Network Services and Capabilities," Proc. Int. Conf. on Dublin Core and Metadata for e-Communities 2002, Florence, Italy, pp. 225-227 (2002).
Bechler et al., "Quality of Service in Mobile and Wireless Networks: The Need for Proactive and Adaptive Applications," Proceedings of the 33rd Hawaii International Conference on System Sciences, University of Karlsruhe (2000).

(Continued)

*Primary Examiner*—William Trost, IV
*Assistant Examiner*—Raj Jain
(74) *Attorney, Agent, or Firm*—Ryan, Mason & Lewis, LLP

(57) ABSTRACT

Techniques for adaptive QoS include selecting, based on one or more QoS criteria corresponding to a client, one or more given data items suitable for sending to the client in response to a query from the client. The one or more given data items are selected from a set of data items. One or more statistics are associated with the one or more data items. The one or more statistics are useable to modify which data items are included in the set of data items. The statistics may be used by removing unpopular data items, as determined by the statistics, from the set of data items in the communication system. Additionally, data items exceeding the one or more QoS criteria can be transcoded to create new data items meeting the one or more QoS criteria, and the new data items can be added to the set of data items in the communication system. Thus, the set of data items can be changed depending on current demand by users for particular data items.

28 Claims, 5 Drawing Sheets

OTHER PUBLICATIONS

Margaritidis et al., "Adaptation Techniques for Ubiquitous Internet Multimedia," *Wireless Communications and Mobile Computing*, vol. 1, No. 2, pp. 141-163 (Jan. 2001).

A.N. Desai, "An Adaptive QoS Mechanism for Multimedia Applications in Heterogeneous Environments," A thesis submitted to the Graduate school of New Brunswick Rutgers, New Brunswick, New Jersey (2001).

Nahrstedt et al., "QoS-Aware Middleware for Ubiquitous and Heterogeneous Environments," *IEEE Communications* Magazine 2001.

Chalmers et al., "QoS and Context Awareness for Mobile Computing," Department of Computing, Imperial College, London (1999).

Chalmers et al., "QoS and Context Awareness for Mobile Computing," Proc. 1st Intl. Symposium on Handheld and Ubiquitous Computing, Karlsruhe, Germany (Sep. 1999).

Krasic et al., "QoS Scalability for Streamed Media Delivery," 0GI CSE *Technical Report* SCE-99-011 (Sep. 1999).

* cited by examiner

FIG. 3

|   | $D_1$ | $D_2$ | $D_3$ | $D_4$ | $D_5$ |
|---|---|---|---|---|---|
| $Q_1$ |  | $W_{21}$ | $W_{31}$ | $W_{41}$ | $W_{51}$ |
| $Q_2$ | $W_{12}$ |  | $W_{32}$ | $W_{42}$ |  |
| $Q_3$ | $W_{13}$ | $W_{23}$ |  | $W_{43}$ | $W_{53}$ |
| $Q_4$ | $W_{14}$ | $W_{24}$ | $W_{34}$ | $W_{44}$ | $W_{54}$ |

ADAPTIVE QOS SYSTEM AND METHOD

CROSS-REFERENCE TO RELATED APPLICATIONS

This application claims the benefit of provisional patent application No. 60/490,627, filed on Jul. 28, 2003, the disclosure of which is hereby incorporated by reference.

FIELD OF THE INVENTION

The present invention relates to communication systems and, more particularly, relates to Quality of Service (QoS) in communication systems.

BACKGROUND OF THE INVENTION

Many communication systems exist today to deliver media content over networks, such as the Internet, to client computers subject to a Quality of Service (QoS) requirement. There are different types of QoS requirements. Some communication systems use dropped or lost packets as a measure of QoS. In other systems, QoS is a function of visual fidelity, such as resolution and frame rate. Additionally, QoS can involve audio quality. Both visual fidelity and audio quality are usually controlled by the amount of compression of the source data and the bit rate at which the source data can be delivered. Typically, compression and bit rate are inversely related to QoS. For instance, high compression generally correlates with low QoS.

QoS is changing as wireless and wired devices become smaller and more prevalent. What was once acceptable for a user using a desktop computer might not be suitable for the same user using a Personal Digital Assistant (PDA), as the PDA might not be able to support large video or audio files. In fact, a user using a PDA could have a lower QoS requirement, with no perceived harm, than when the user uses a desktop computer. Consequently, QoS requirements are in a state of flux.

Thus, there is a need to provide methods and apparatus suitable for dealing with changes in QoS in communication systems.

SUMMARY OF THE INVENTION

The present invention provides adaptive Quality of Service (QoS) methods and apparatus.

In an aspect of the invention, techniques for providing adaptive QoS include selecting, based on one or more QoS criteria corresponding to a client, one or more given data items suitable for sending to the client in response to a query from the client. The one or more given data items are selected from a set of data items. One or more statistics are associated with the one or more data items. The one or more statistics can be used to modify which data items are included in the set of data items.

The statistics may be used by removing unpopular data items, as determined from the statistics, from the set of data items. Additionally, data items exceeding the one or more QoS criteria can be transcoded to create new data items meeting the one or more QoS criteria, and the new data items can be added to the set of data items in the communication system. Thus, the set of data items can be changed depending on current demand by users for particular data items.

The one or more QoS criteria may correspond to the client, so different clients could have different QoS criteria. The one or more QoS criteria may include company policies, and the company policies can be cost-related. For instance, a bandwidth restriction might be placed on users in the company when bandwidth used for a predetermined time, such as a month, exceeds a certain amount of bandwidth.

A more complete understanding of the present invention, as well as further features and advantages of the present invention, will be obtained by reference to the following detailed description and drawings.

BRIEF DESCRIPTION OF THE DRAWINGS

FIG. 3 illustrates an exemplary matrix layout for a two-dimensional portion of a three-dimensional resource constraint matrix, where the matrix layout comprises different bandwidth requirements at QoS levels of $Q_1$, $Q_2$, $Q_3$, and $Q_4$, in accordance with a preferred embodiment of the invention;

DETAILED DESCRIPTION OF PREFERRED EMBODIMENTS

Figure 1:
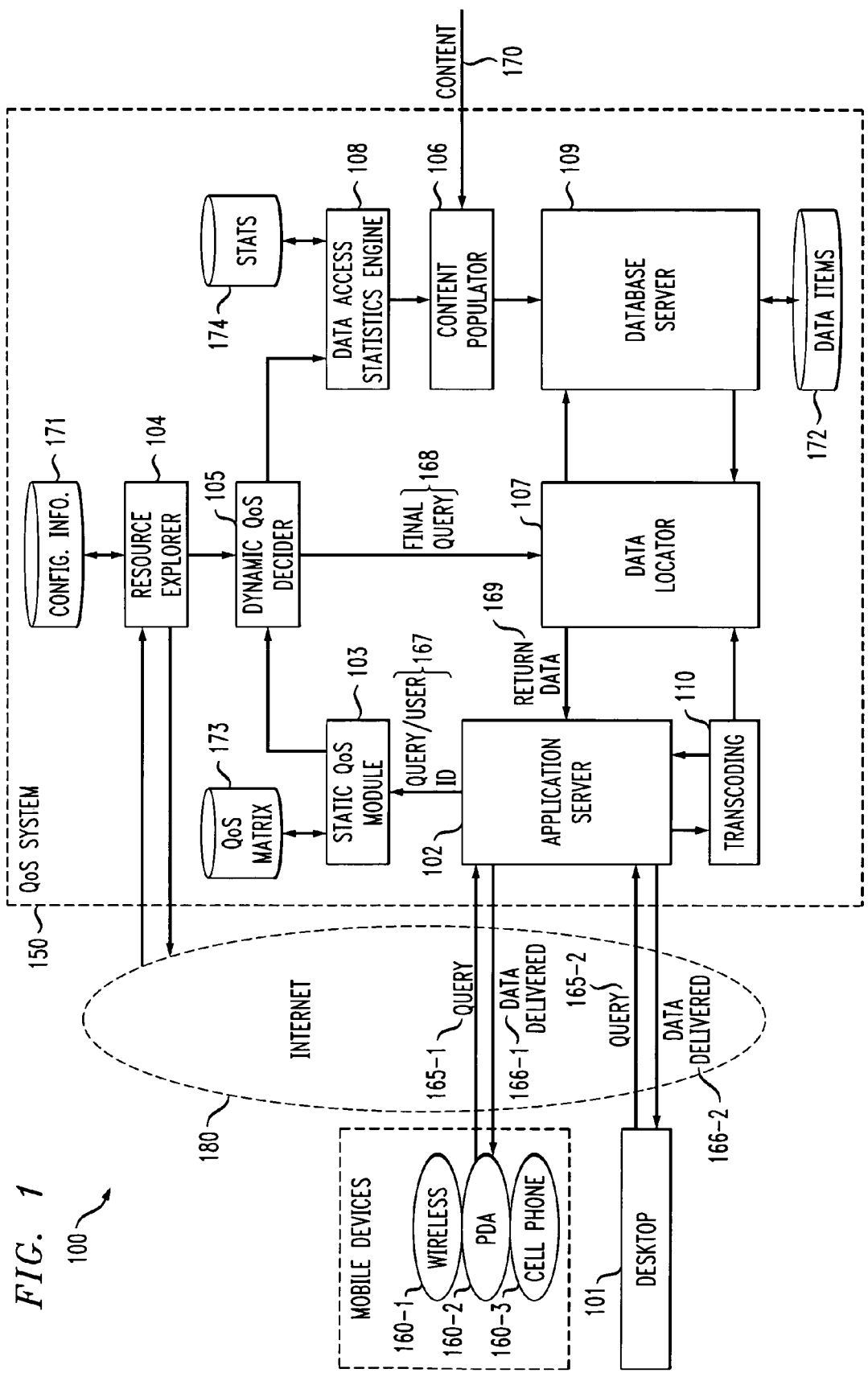
FIG. 1 is a block diagram of a communication system for adaptive QoS in accordance with an exemplary embodiment of the present invention.

Before proceeding with a description of exemplary embodiments of the present invention, it is helpful to review additional topics.

A topic that is beneficial to review is transcoding. Transcoding is a way of dealing with web information query, retrieval, delivery and display services for a variety of devices. Transcoding techniques can include the following:

1) content adaptation (e.g., throwing away things to reduce bandwidth);

2) file format transformation (e.g., such as converting text from the relatively large document format to a smaller text format); and 3) image transcoding (e.g., reducing image dimensions or colors, or increasing compression to reduce bandwidth).

There are two kinds of existing transcoding systems: static transcoding and dynamic transcoding. For static transcoding, various static data formats are stored and made available in response to queries. This provides fixed services to various devices. The user requests information, through a query, in the appropriate format for his or her environment. For dynamic transcoding, content is modified for simplification and the file format is generally changed during transmission. For example, a file format could be converted from a high-bandwidth wired transmission protocol to a low bandwidth wireless transmission protocol.

Traditional text and image data are relatively small, so dynamic transcoding is possible, and a cache of an affordable size can hold many objects. Examples of transcoding small data, easily transcoded dynamically, are as follows: converting HyperText Markup Language (HTML) to fit a particular screen size by reformatted images; converting eXtensible Markup Language (XML) to various presentation formats; and converting HTML into Wireless Markup Language (WML).

For large streaming data, such as video, images, and text, however, the objects in the data become too large. Consequently, dynamic transcoding is lengthy and may delay or slow transmission for users. In this case, translation must be done ahead of time, which defeats traditional dynamic transcoding. Also, large objects, such as video, take up so much space that fewer of them can be held in a cache for reuse.

In short, static transcoding problems include the following: assets in a fixed set of pre-populated formats, which cannot change and which are not flexible; and some formats of data may never be used.

Dynamic transcoding problems include the following: long retrieval and delivery delay when a medium-sized object is transcoded on demand; lack of flexibility in the transcoding rules (for example, a medical image might not be able to be transcoded from a lossless image to a lower quality image) and inflexible user preferences; and expensive resource utilization.

A challenge is how to provide system support for using various devices for remote information retrieval and delivery across wired and wireless networks. A critical issue is unnecessary response delays, which includes both initial delay because a requesting device must transcode a large amount of information, as well as ongoing delay when the data delivery is at too high a bandwidth for the transmission network or for device capabilities.

An exemplary embodiment of the present invention, in contrast to traditional dynamic and static transcoding techniques, populates assets in an original format and in frequently-requested formats according to system and user-access statistics, which guarantee a high probability that the requested data will be there and ready to be transmitted when requested. The system may also evolve according to network infrastructure and device capability as technology gradually improves. Compared to embodiments of the present invention, static transcoding gives the task of selecting data format to users or clients. By contrast, an exemplary embodiment of the present invention can employ statistical information gathering to allocate data with popular formats and can select appropriate data to meet QoS requirements for the users or clients.

The present invention may perform one or more of the following:

1) shaping a query of a user under limitations such as a QoS subscription of a user, network constraints, device constraints, user preferences, and organizational policies;

2) selecting a common set for all constraints as a shaped query limitation;

3) filtering the query to make a server provide more services;

4) delivering data so that the delivered data depends on the maximum QoS; and 5) collecting statistics of data accessed or data delivered to web clients, where the statistics can be used to make an exemplary system be able to evolve.

Exemplary advantages of certain embodiments of the present invention include faster document retrieval and shorter response time, as well as increased resource utilization (e.g., device and network bandwidth) under user preference or organization policies. Exemplary embodiments of the present invention can perform conversions on query languages with dynamic QoS combinations. Conversions may be performed by, for instance, one or more of the following:

1) a QoS web query provider, which can provide the maximum QoS under limitations to suit the queries;

2) a fast retrieval server that can deliver data streams even when the server cannot do run-time transcoding;

3) making suitable modifications on data delivered to suit the resources available;

4) providing short response time and retrieval time, reducing the processing time;

5) a preordered data storage and corresponding matrix for changing configuration dynamically to make the system dynamically suitable for web queries from various devices;

5) an infrastructure that is a superset of transcoding; and 6) a system with self-adaptive properties, which can accommodate updates for devices through pre-generating information in the most-requested formats, as well as removing less popular data, using for instance continuous network performance and device configuration monitoring.

In an illustrative embodiment, resource constraints are typically used to decide the QoS that can be provided, and the QoS can be used to determine the query satisfaction. One exemplary mechanism to provide a trade-off between time (e.g., retrieval time; response delay) and space (e.g., storage space) that gives the maximum QoS under resource constraints is by employing dynamic programming techniques and linear programming techniques. Exemplary embodiments of the present invention can further provide the most favorable data format by using user preferences and the monitoring of mobile device configuration statistics during system operation. As devices and bandwidth trends change, so do the most frequently requested data formats as monitored by the system. Data formats include, for example, the following: file formats; compression techniques; compression levels; image dimensions; and text size. In an exemplary embodiment, the system dynamically transcodes content when the delay is small enough to fit within QoS constraints, and the system will keep a traditional cache of these transcoded results.

Turning now to FIG. 1, a communication system 100 is shown employing an exemplary embodiment of the present invention. FIG. 1 shows a number of mobile devices 160 and a desktop computer system 101 interacting with a network 180 and with a QoS system 150. The network 180 is, in this example, the Internet, but network 180 could be a wireless network, wired network, a combination of wireless and wired network, a local area network, or a wide area network. FIG. 1 will be used to describe an exemplary system design, while FIG. 2 will be used to explain illustrative data and control flows through network 100. It should be noted that FIG. 1 is merely exemplary and components of the system may be combined, may be deleted and may have new components added.

QoS system 150 comprises an application server 102, a static QoS module 103, a resource explorer 104, a dynamic QoS decider 105, a content populator 106, a data locator 107, a data access statistics engine 108, a database server 109, a transcoding module 110 (in application server 102), a configuration information database 171, a data items database 172, a QoS matrix database 173, and a statistics database 174. Content 170 is communicated by one or more content providers (not shown) to content populator 106.

The mobile devices 160 or desktop computer system 101 queries for data by using the application server 102. Mobile devices 160 are, in this example, a wireless device 160-1 (e.g., such as a laptop using a wireless connection), a Personal Digital Assistant (PDA) 160-2, and a cellular phone 160-3. The mobile devices 160 communicate a query 165-1 to the application server 102 and expect data 166-1 to be delivered in response to the query 165-1. Similarly, the desktop computer system 101 queries the application server 102 by using a query 165-2 and the desktop computer system 101 expects data 166-2 to be delivered in response to the query 165-2. These clients (e.g., the mobile devices 160 and the desktop computer system 101) have configuration information collected by the resource explorer 104.

Application server 102 provides middleware support and is a provider for a dynamic QoS data delivery service for devices such as mobile devices 160 or desktop computer system 101. A static QoS module 103 has one or more QoS matrixes, stored in QoS matrix database 173, based on user QoS subscriptions, user preferences, and organization policies, which are organized by client identification (ID) or other suitable techniques. It should be noted that organization policy could include bandwidth restrictions (e.g., to save cost), a cost ceiling, other cost-related policies, or other policies. The cost ceiling could also involve bandwidth or similar data restrictions. For instance, if the organization uses a certain amount of data per month, the organization might require a lower QoS in order to lower the bandwidth being used. The lower QoS is factored in a cost ceiling. The cost ceiling could be graduated so that lower QoS is used for higher bandwidth. The QoS matrixes can contain maximum QoS based on user QoS subscriptions, user preferences, and organization policies, and the maximum QoS can be used, as described below, when shaping a query.

Resource explorer 104 monitors (e.g., as illustrated by the oval below the resource explorer 104) network circumstances and device configuration, such as mobile phone, PDA device, bandwidth available, and protocol information. The network circumstances and device configuration are stored as configuration information in configuration information database 171.

A dynamic QoS decider 105 can shape a query 165 and makes decisions about the deliverable QoS under resource constraints. Dynamic programming techniques and integer programming techniques may be used in the dynamic QoS decider 105 to shape the query 165, and this is described in additional detail below.

A content populator 106 supervises pre-generation of most frequently requested content and data formats for incoming new content, populates this content into the database server 109, and if storage space is running low, can remove less popular data, where popularity is determined using statistical information from statistics database 174. The content populator 106 also supervises initial data loading, storing the original form of the data, and likely QoS versions of the data with the help of the application server 102 and the transcoding module 110. The data is stored in data items database 172.

Data locator 107 locates data, in data items database 172, having an appropriate format that satisfies QoS, and in one embodiment maximum QoS, using the database server 109. Data access statistics engine 108 gathers information from the dynamic QoS decider 105, regarding what type of data is requested and also the format for the data that is requested, and collects statistics on this information for the content populator 106. The statistics are stored in statistics database 174.

Database server 109 has pre-stored data that can be also be changed dynamically. Transcoding module 110 is, in an exemplary embodiment, an embedded component, which transcodes those data that do not have an appropriate format stored for the required QoS.

Figure 2:
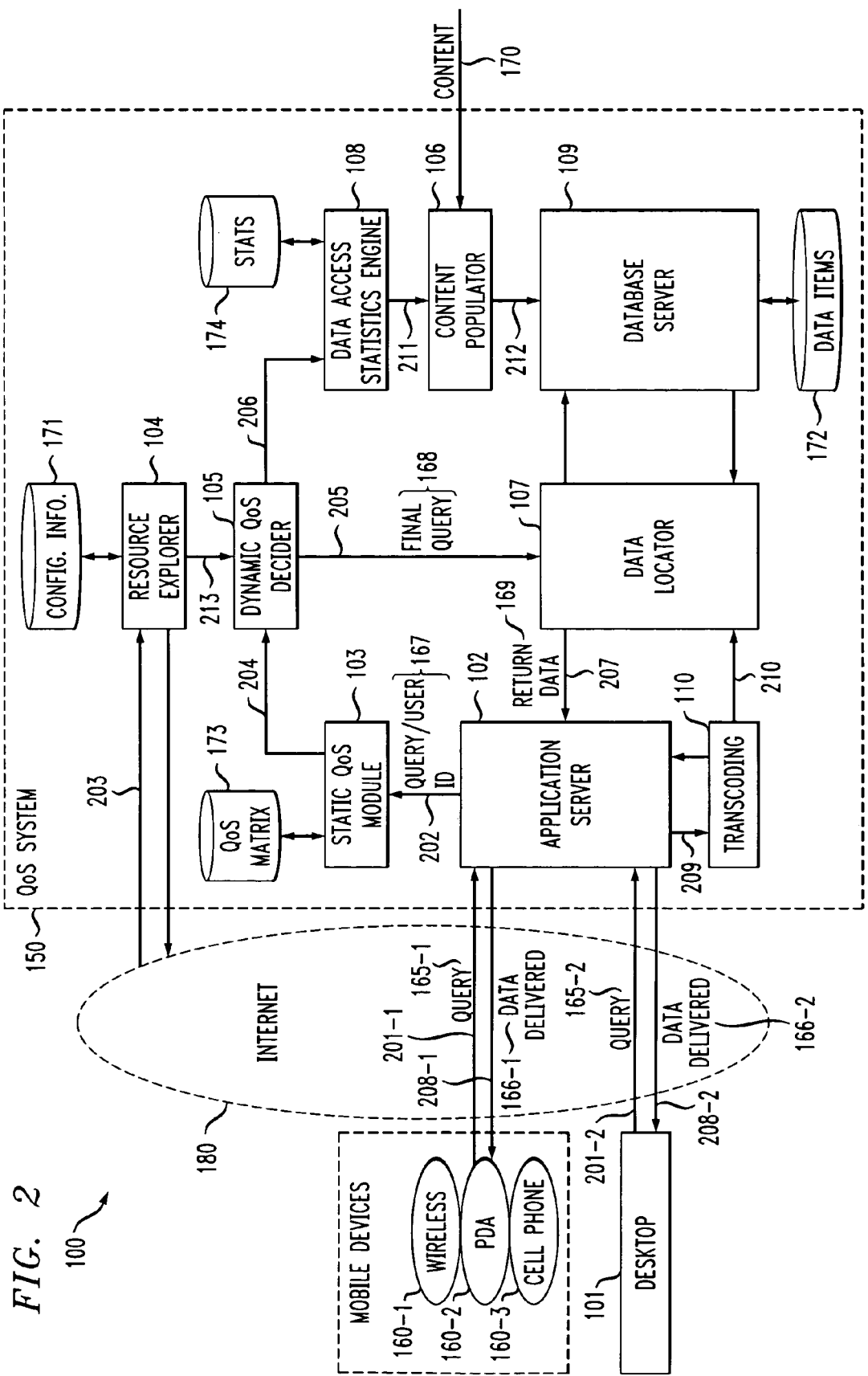
FIG. 2 is the block diagram of FIG. 1 but used to illustrate an exemplary procedure for adaptive QoS, including data flows and control flows, in the communication system of FIG. 1.

FIG. 2 is used to illustrate an exemplary procedure for adaptive QoS, including data and control flows, in the system 100. In step 201 (e.g., 201-1 or 201-2), a mobile device 160 or the desktop computer system 101 sends an information request, in the form of a query 165, to the application server 102. A query 165 is associated with a user ID or device ID, which may be part of the query 165. In the example of FIG. 2, the query 165 is associated with a user or device ID, but is separate from the query 165. A user ID identifies a user of a device while a device ID identifies the device itself. One or both of the user ID and device ID may be used, and the term client ID will refer to one or both of the user ID and device ID.

In step 202, the application server 102 receives the query 165, and sends the query and user ID (in this example) 167 to the static QoS module 103 to obtain, based on user ID, QoS criteria such as the maximum QoS parameters to which the user is subscribed, the user preferences, and the user organization bandwidth policy, for instance.

In step 203, network performance information and user device configurations (e.g. from configuration information database 171), such as device type or model or both, Central Processing Unit (CPU) capacity, buffer size, memory, and bandwidth (e.g., modem bandwidth), are collected by resource explorer 104 and sent, in step 213, to the dynamic QoS Decider 105.

In step 204, the dynamic QoS decider 105 shapes the query 167 further based on a combination of configuration information from the resource explorer 104 and the maximum QoS from the static QoS module 103 (e.g., using a QoS matrix stored in QoS matrix database 173). The dynamic QoS decider 105 performs shaping, in an exemplary embodiment, by modifying the query 167 based on this combination of information. For example, configuration information from the resource explorer 104 may indicate that a quality level of 10 is suitable to meet QoS criteria for a particular user, and the maximum QoS from static QoS module 103 might restrict the particular user to a quality level of nine. However, only a data item having a QoS level of eight might be available, which is close enough to the QoS level of nine so that transcoding is not necessary, so the final query 168 will be for QoS level eight (e.g., or be for a data item meeting a QoS level of eight).

In step 205, the final query 168 is sent to the data locator 107 with an indication of the data item requested and the format thereof, and the data locator 107 retrieves the data item from the database server 109 for the maximum QoS under the resource constraints. In step 206, the dynamic QoS decider 105 also sends information from the final query 168 to the data access statistics engine 108, where the information indicates what kind of data and its corresponding format has been requested by the user. Statistics can be gathered on, for instance, file format, compression techniques, compression levels, image dimensions, and text size for the data items. The data access statistics engine 108 updates the statistics in statistics database 174 based on the information.

In step 207, a data item is retrieved with a corresponding format, if the format exists, or the best quality that is available under the resource constraints as found by the data locator 107 and is sent back to the application server 102 to service the query. In step 208, the application server 102 sends back information to the client (e.g., mobile device 160 or desktop computer system 101) with the data available in format requested or the best quality under the constraints.

In step 209, if there is data that is better in quality, compared to the output decision of the dynamic QoS decider 105, and that is suitable for use for the requested data, the better quality data is sent through the transcoding module 110 component to be transcoded, and the transcoded data in the new format is sent to system client to satisfy the QoS level.

In step 210, this transcoded copy of the data is also sent back to the database server 109 for persistent storage and information from the data locator 107 regarding the transcoded copy of the data is also updated with indication of the existence of this new transcoded data format.

Through evaluation by dynamic QoS decider 105 and resource explorer 104 of data access to the system, the data access statistics engine 108 can determine the most requested format or formats of a different data type. This information is then provided, in step 211, to content populator 106 component.

For existing data, the content populator 106 receives from data access statistics engine 108 information on what data is being requested and at what QoS. The content populator 106 then picks up new content coming into the system or content in the database server 109 and requests, in step 209, transcoding module 110 to produce the most frequently requested formats of data to store. That data plus the original incoming content is then populated, in step 212, into database server 109 (e.g., in data items storage 172) and the data and original content are made known to the data locator 107. However, before the new data is stored, the content populator 106 inspects how much space will be needed and commands the database server 109 to remove any non-original data at QoS levels that have not recently been popular, according to statistics in the statistics database 174.

Alternatively, the transcoding, in step 209, could be done at the data locator 107 or the database server 109, or a second transcoding module 110 could be attached to the content populator 106 for just incoming new data to simplify internal communications.

The following describes an example of how selection is made of the set of data items to get the best QoS for information required under various resource constraints. Techniques to find the maximum QoS combinations typically involve using dynamic programming for one resource constraint, and using integer programming techniques for multiple resource constraints. Dynamic QoS decider 105 uses these techniques to locate the data set under current resource constraints. The data locator 107 then selects corresponding data set from the database server 109 with possible transcoding.

For data items stored in the database server 109, the dynamic QoS decider 105 has, in an exemplary embodiment, a three-dimensional resource constraint matrix (not shown in FIGS. 1 and 2) to describe the relationship between the required data and the QoS for each kind of resource constraint, such as bandwidth and display device model. The resource constraints can come from the configuration information (e.g., device type or model or both, CPU capacity, buffer size, memory, modem bandwidth, and wireless network bandwidth) in configuration information database 171 and information (e.g., maximum QoS based on the user QoS subscriptions, user preferences, and organization policies, where the maximum QoS is a constraint on the network in the communication network 100) in the QoS matrix database 173. Any constraint that affects QoS and that corresponds to a resource in a network may be used as a resource constraint. For each kind of resource, in an exemplary embodiment, the dynamic QoS decider 105 has one corresponding two-dimensional matrix.

FIG. 3 is an exemplary portion of a resource constraint matrix stored in the dynamic QoS decider 105 for one resource constraint. This matrix provides an array showing for each individual data item ($D_i$, i=1, 2, . . . ), how much resource (in this example, bandwidths $W_{ij}$, i, j=1, 2, . . . ) is required to satisfy a certain QoS level ($Q_j$, j=1, 2, . . . ). The task for the dynamic QoS decider 105 is to select a corresponding resource requirement $W_{ij}$ for each data item $D_i$ to maximize QoS, Q*, under a resource constraint of R.

Figure 4:
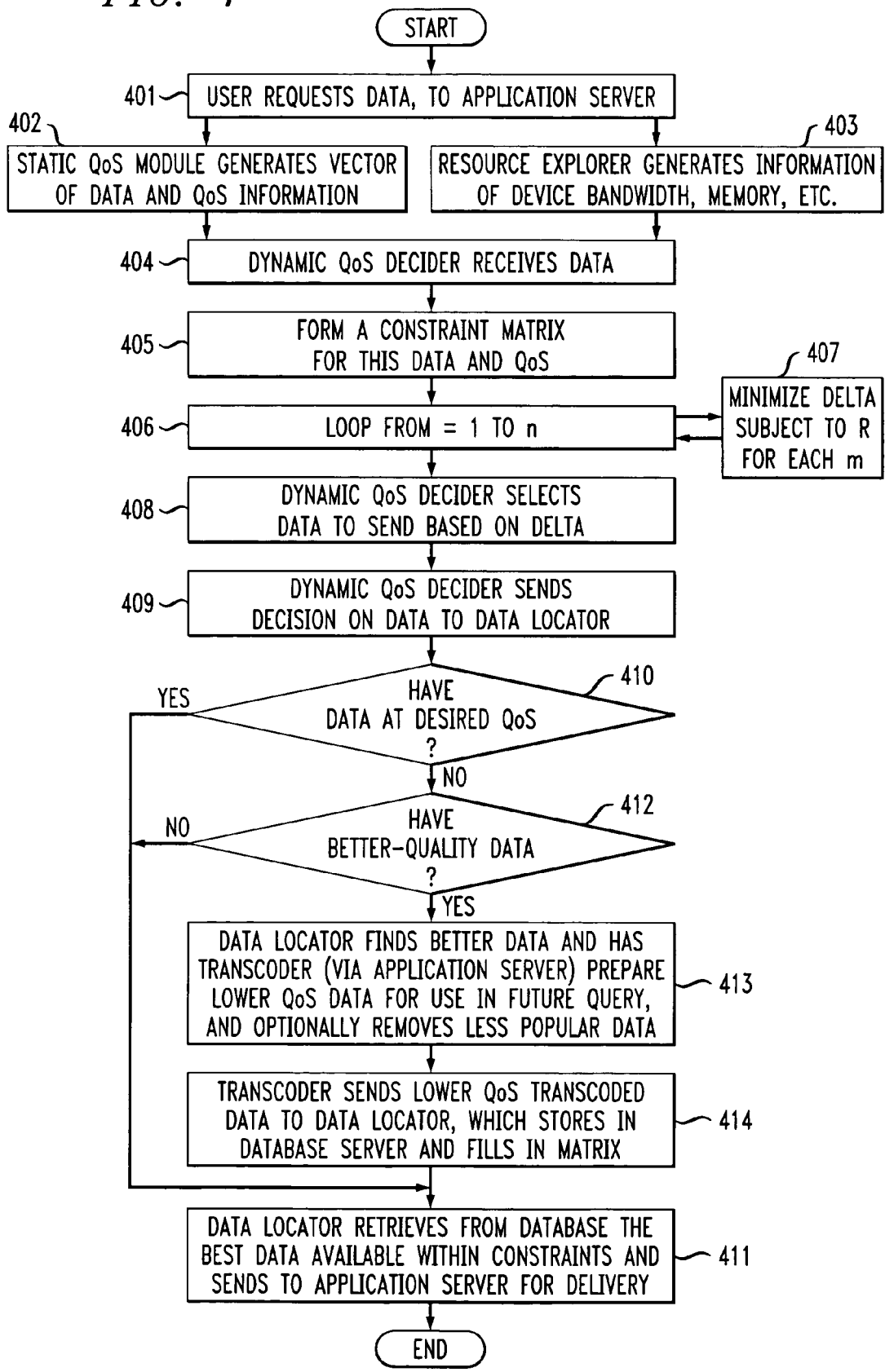
FIG. 4 is a flowchart of an exemplary method for making adaptive QoS data decisions, in accordance with a preferred embodiment of the invention.

FIG. 4 shows a flow chart of an exemplary procedure for making data decisions. In step 401, the user, using a mobile device 160 or desktop computer system 101, sends a request, using a query 165, for data. In step 402, the static QoS module 103 generates a vector of required data and a corresponding QoS level according to the client ID from the application server 102. The vector of required data and a corresponding QoS level are matched to stored client IDs, each of which is associated with subscribed QoS, user preference and organization policy, and the data that user requested via the application server 102.

In step 403, the resource explorer 104 provides configuration information (e.g., from configuration information database 171) of resource availability and resource constraints, such as user device model, communication channel bandwidth, and client memory size. In step 404, the dynamic QoS decider 105 solves the problem of how to dynamically select queried data for the data locator 107. In an illustrative embodiment, the solution is based on a dynamic programming technique for one constraint (using one two-dimensional matrix, for example, under a bandwidth matrix plane) and integer programming techniques for multiple constraints (using a three-dimensional matrix, for example, under both bandwidth and display device model matrix planes). Exemplary techniques for integer programming and model matrixes are shown in Ezechukwu and Maros, "OOF: Open Optimization Framework," Departmental Technical Report 2003/7, Department of Computing, Imperial College London (2003), the disclosure of which is hereby incorporated by reference.

In step 405, using information from the resource explorer 104, the dynamic QoS decider 105 can determine a two-dimensional resource constraint matrix for individual constraints and form a three-dimensional resource constraint matrix. That is, using for instance display device model information, the corresponding two-dimensional resource constraint matrix can be selected. The two-dimensional resource constraint matrix (e.g., see FIG. 3) is used for every request with resource constraints detected by the resource explorer 104. As shown in FIG. 3, a two-dimensional resource constraint matrix is a matrix for resource requirements on data items $D_1$, $D_2$, $D_3$, $D_4$, and $D_5$. For each data item $D_i$, the resource constraint matrix will require a resource requirement of $W_{ij}$ for the resource if the QoS is to be at level $Q_j$. A blank entry at a point in the matrix means that the data is not suitable for delivery under that resource constraint, such as a resource constraint for images on a character-based display device.

For different kinds of data items, say $D_1$, $D_2$, $D_3$, $D_4$, $D_5$, . . . , based on, for instance, the data formats of the data items such as file format, compression techniques, compression levels, image dimensions, and text size, the data items can be classified into some predefined or fixed QoS levels, $Q_1$, $Q_2$, $Q_3$, . . . , ($Q_1 > Q_2 > Q_3 > $ . . . ), such that once one queries (for instance) data items $D_1$, $D_3$ under QoS level of $Q_4$, one can determine the resource requirement $W_{14} + W_{34}$.

The dynamic QoS decider 105 should select the data set with best QoS under resource constraints. QoS selection selects integrated components with a related set of components under user preference and system allowance. That is, for any resource (for example, bandwidth) with a resource constraint of R, choose to maximize the QoS for each kind of data so as to minimize the difference between the QoS being provided and the QoS to which the user has subscribed. So, for selected data items, their sum of resource requirements needs to be less than or equal to R.

In step 406, for data item m (for m=1 to n), if $Q_{ms}$ is used to denote the QoS provided for the user on data item m at QoS of s, $Q_{ms^*}$ is used as the QoS the user has subscribed for data item m at QoS of s, $P_{m(s^*-s)}$ is the weight for QoS measure of $(Q_{ms}*-Q_{ms})$ for data item m, and $W_{ms}$ is the resource requirement for data item m at QoS of s, one has an inequality for optimization that, in step 407, minimizes the following:

$$\text{delta}=P^*_{1(a^*-a)}\times(Q_{1a}^*-Q_{1a})+P^*_{2(b^*-b)}\times(Q_{2b}^*-Q_{2b})+\ldots+P^*_{n(k^*-k)}\times(Q_{nk}^*-Q_{nk}),$$

subject to the following:

$$W_{1a}+W_{2b}+\ldots+W_{nk}<R,$$

where $P^*$ is a function that $P^*_{m(s^*-s)}=P_{m(s^*-s)}$ if $Q_{ms}^*>Q_{ms}$, and $P^*_{m(s^*-s)}=0$, otherwise, for m=1 to n and s in $\{a, b, \ldots k\}$.

In order to provide the maximum QoS for multiple metrics with multiple data items, the dynamic QoS decider 105 defines the resource constraint matrix with parameters (e.g., QoS specified) on each constraint and solves the sets of inequalities using integer programming techniques.

Once the dynamic QoS decider 105 selects the set of data items under requested QoS criteria, in step 408, the dynamic QoS decider 105 sends the set in step 409 to the data locator 107. If the data is available at the QoS level required (step 410=Yes), the data locator 107 will retrieve the data and send it to the application server 102 for delivery. Otherwise (step 410=No), the data locator 107 will search for better QoS data (step 412). "Better" QoS data is data that meets a higher QoS level. If the better data is found (step 412=Yes), the data locator 107 transcode the better data (e.g., by sending the better data to transcoding module 110 through application sever 102 to create new data having a lower QoS level) to satisfy the resource constraint for future queries (step 413), and the transcoded data that satisfies the QoS queried will be sent back from the transcoding module 110 to the data locator 107 to fill in the resource constraint matrix (e.g., for that entry, which is currently blank) and to store the transcoded data in the database server and storage 109. This occurs in step 414. Hence, the next query on the same QoS and data will find the transcoded data available.

Additionally, less popular data, as determined by statistics such as those provided by statistics database 174, can be removed in step 413.

Steps 413 and 414 therefore allow adaptation to occur for the system.

Meanwhile, for data that was not available with the desired QoS and no better format exists, the data locator 107 will get best QoS that approaches what was desired for best-effort delivery. This occurs in step 411. In this way, evolutionary QoS data format is provided and supported by the dynamic QoS decider 105, the data locator 107, transcoding module 110, and the content populator 106.

In summary, from the importance of information and its capability of the web device: device model, bandwidth, CPU, memory and buffer size at the client side, one can select data using a greedy algorithm (e.g., the dynamic programming technique for one constraint and the integer programming technique for multiple constraints) to select those data items with maximum quality under QoS constraints to satisfy the information request.

Figure 5:
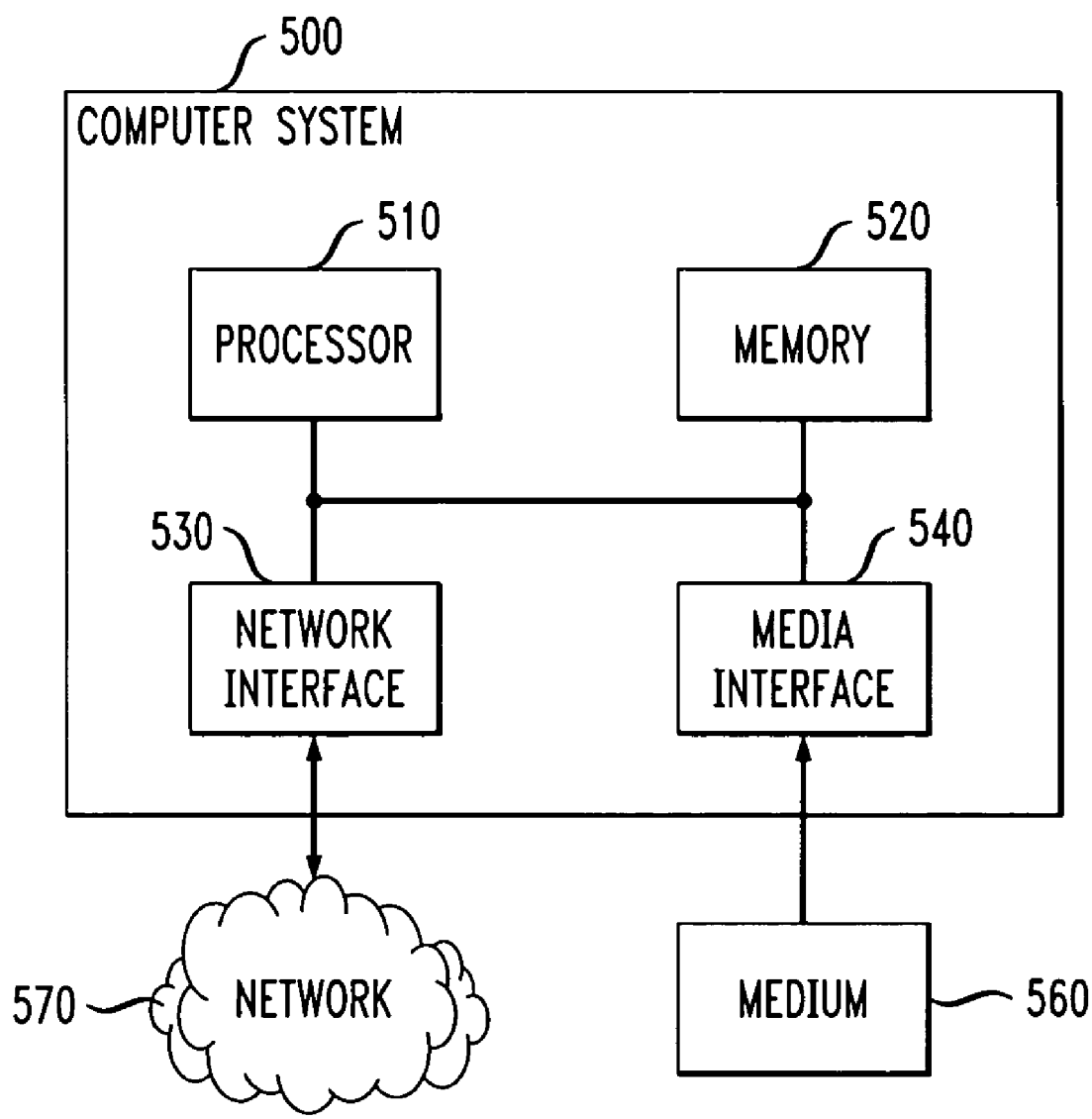
FIG. 5 is a block diagram of a computer system suitable use for one or more embodiments of the present invention.

Turning now to FIG. 5, a computer system 500 is shown that is suitable for implementing one or more components of the QoS system 150. Computer system 500 comprises a processor 510 that is singular or distributed, a memory 520 that is singular or distributed, a network interface 530, and a media interface 540. The network interface 530 couples to a network 570 (e.g., portions of a value network). The media interface 540 couples to a computer readable medium 560, which comprises one or more programs (not shown) which, when implemented, carry out portions or all of the present invention. For example, the semantic matchmaking device 800 can be included as a program. The program, when loaded into processor 510 (typically from memory 520), will configure the processor 510 to implement a portion or all of the QoS system 150.

It is to be understood that the embodiments and variations shown and described herein are merely illustrative of the principles of this invention and that various modifications may be implemented by those skilled in the art without departing from the scope and spirit of the invention.

What is claimed is:

1. In a communication system, a method for providing adaptive Quality of Service (QoS), comprising a processor configured to perform the steps of:
   selecting, based on one or more QoS criteria corresponding to a client, one or more given data items suitable for sending to the client in response to a query from the client, the one or more given data items selected from a set of data items, wherein each QoS criteria is based on two or more of a capability of said client, a policy associated with said client, and a client request; and
   determining one or more statistics associated with the one or more given data items;
   wherein the one or more statistics are useable to modify which data items are included in the set of data items.

2. The method of claim 1, wherein the method further comprises the step of removing one of data items from the set of data items when the one data item has a corresponding statistic below a predetermined value.

3. The method of claim 1, wherein a given one of the one or more statistics corresponds to data format of the one or more given data items, and the data format comprises one or more of the following: file format of the one or more given data items; compression technique used to create the one or more given data items; compression level of the one or more given data items; image dimensions for the one or more given data items; and text size for the one or more given data items.

4. The method of claim 1, wherein the one or more QoS criteria comprise one or more of the following: a QoS subscription of a user, network constraints, device constraints, user preferences, a QoS level and organizational policies.

5. The method of claim 1, wherein the one or more QoS criteria comprise one or more organizational policies and at least one of the one or more organizational policies comprises a cost.

6. The method of claim 1, wherein the one or more given data items comprise one or more of the following: images, text, audio, and video.

7. The method of claim 1, wherein the step of selecting one or more given data items further comprises the step of determining at least a portion of the one or more QoS criteria by using one or more of the following: a user identification corresponding to the client and a device identification corresponding to the client.

8. The method of claim 1, wherein there are a plurality of resources associated with the communication network and wherein the step of determining one or more given data items further comprises the step of determining if a given data item meets the one or more QoS criteria.

9. The method of claim 8, wherein:
   the step of selecting one or more given data items further comprises the steps of
      if the given data item does not meet the one or more QoS criteria, determining another data item that exceeds the one or more QoS criteria; and
      transcoding the other data item to meet the one or more QoS criteria; and the method further comprises the step of communicating the transcoded other data item to the client.

10. The method of claim 8, wherein:
the step of selecting one or more given data items further comprises the step of determining another data item not meeting the one or more QoS criteria but coming closest, as compared to all other data items in the set of data items and as determined by a metric, to the one or more QoS criteria; and
the method further comprises the step of communicating the other data item to the client.

11. The method of claim 1, wherein the step of selecting one or more given data items comprises the steps of:
transcoding a given one of the set of the data items in order to meet the one or more QoS criteria; and
storing the transcoded given data item as part of the set of data items.

12. The method of claim 1, wherein:
there is at least one resource associated with the communication network;
the one or more QoS criteria comprise a plurality of subscribed QoS levels, each subscribed QoS level corresponding to a data item in the set of data items;
there are a plurality of predetermined QoS levels, each corresponding to one of the at least one resources and to a data item in the set of data items; and
the step of selecting one or more given data items further comprises the step of selecting the one or more given data items by using the plurality of predetermined QoS levels and the plurality of subscribed QoS levels.

13. The method of claim 12, wherein the step of selecting the one or more given data items by using the plurality of predetermined QoS levels and the plurality of subscribed QoS levels further comprises the steps of:
computing a value for a first equation comprising functions that provide weights using both selected ones of the predetermined QoS levels and selected ones of the subscribed QoS levels, and comprising factors having differences between the selected ones of the predetermined QoS levels and the selected ones of the subscribed QoS levels, wherein the step of computing is performed subject to a resource constraint for each of the at least one resources; and
performing the step of computing until the value decreases a predetermined amount, wherein a result of the equation comprises the one or more given data items that meet the QoS criteria of the plurality of subscribed QoS levels.

14. The method of claim 13, wherein the step of performing is repeated until the value is minimized.

15. The method of claim 1, wherein:
the query comprises a first query;
the method further comprises the step of shaping the first query to create a second query; and
the step of selecting one or more given data items further comprises the step of selecting, based on one or more QoS criteria, one or more given data items suitable for sending to the client in response to the second query.

16. The method of claim 15, wherein the first query comprises the one or more QoS criteria, and the step of shaping the query further comprises the step of using a combination of configuration information and a maximum QoS to modify the one or more QoS criteria to modified one or more QoS criteria, and wherein the step of selecting one or more given data items further comprises the step of selecting, based on the modified one or more QoS criteria, one or more given data items suitable for sending to the client in response to the second query.

17. In a communication system, an apparatus for providing adaptive Quality of Service (QoS), the apparatus comprising:
at least one computer system comprising:
one or more memories; and
one or more processors coupled to the one or more memories, the one or more processors configured:
to select, based on one or more QoS criteria corresponding to a client, one or more given data items suitable for sending to the client in response to a query from the client, the one or more given data items are selected from a set of data items, wherein each QoS criteria is based on two or more of a capability of said client, a policy associated with said client, and a client request; and
to determine one or more statistics associated with the one or more given data items;
wherein the one or more statistics are useable to modify which data items are included in the set of data items.

18. The apparatus of claim 17, wherein the one or more processors are further configured to remove one of data items from the set of data items when the one data item has a corresponding statistic below a predetermined value.

19. The apparatus of claim 17, wherein a given one of the one or more statistics corresponds to data format of the one or more given data items, and the data format comprises one or more of the following: file format of the one or more given data items; compression technique used to create the one or more given data items; compression level of the one or more given data items; image dimensions for the one or more given data items; and text size for the one or more given data items.

20. The apparatus of claim 17, wherein the one or more QoS criteria comprise one or more of the following: a QoS subscription of a user, network constraints, device constraints user preferences, a QoS level, and organizational policies.

21. The apparatus of claim 17, wherein the one or more QoS criteria comprise one or more organizational policies and at least one of the one or more organizational policies comprises a cost.

22. The apparatus of claim 17, wherein the one or more given data items comprise one or more of the following: images, text, audio, and video.

23. The apparatus of claim 17 wherein the one or more processors are further configured, when selecting one or more given data items, to determine at least a portion of the one or more QoS criteria by using one or more of the following: a user identification corresponding to the client and a device identification corresponding to the client.

24. The apparatus of claim 17, wherein there are a plurality of resources associated with the communication network and wherein the one or more processors are further configured, when determining one or more given data items, to determine if a given data item meets the one or more QoS criteria.

25. The apparatus of claim 17, wherein the one or more processors are further configured, when selecting one or more given data items:
to transcode a given one of the set of the data items in order to meet the one or more QoS criteria; and
to store the transcoded given data item as part of the set of data items.

26. The apparatus of claim 17, wherein:
there is at least one resource associated with the communication network;
the one or more QoS criteria comprise a plurality of subscribed QoS levels, each subscribed QoS level corresponding to a data item in the set of data items;

there are a plurality of predetermined QoS levels, each corresponding to one of the at least one resources and to a data item in the set of data items; and the one or more processors are further configured, when selecting one or more given data items, to select the one or more given data items by using the plurality of predetermined QoS levels and the plurality of subscribed QoS levels.

27. The apparatus of claim 17, wherein:

the query comprises a first query;

the one or more processors are further configured to shape the first query to create a second query; and the one or more processors are further configured, when selecting one or more given data items, to select, based on one or more QoS criteria, one or more given data items suitable for sending to the client in response to the second query.

28. A computer readable medium containing one or more programs which when executed by a processor implement the steps of:

selecting, based on one or more QoS criteria corresponding to a client, one or more given data items suitable for sending to the client in response to a query from the client, the one or more given data items are selected from a set of data items, wherein each QoS criteria is based on two or more of a capability of said client, a policy associated with said client, and a client request; and determining one or more statistics associated with the one or more given data items;

wherein the one or more statistics are useable to modify which data items are included in the set of data items.

* * * * *

UNITED STATES PATENT AND TRADEMARK OFFICE
CERTIFICATE OF CORRECTION

PATENT NO. : 7,636,363 B2 Page 1 of 1
APPLICATION NO. : 10/813865
DATED : December 22, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1606 days.

Signed and Sealed this

Ninth Day of November, 2010

David J. Kappos
*Director of the United States Patent and Trademark Office*